(No Model.)

R. L. PRATT.
ADJUSTABLE CUFF RETAINER.

No. 376,547. Patented Jan. 17, 1888.

WITNESSES:

INVENTOR:
R. L. Pratt
BY Munn & Co.
ATTORNEYS.

UNITED STATES PATENT OFFICE.

ROBERT LEE PRATT, OF TIGERVILLE, LOUISIANA.

ADJUSTABLE CUFF-RETAINER.

SPECIFICATION forming part of Letters Patent No. 376,547, dated January 17, 1888.

Application filed June 25, 1887. Serial No. 242,486. (No model.)

*To all whom it may concern:*

Be it known that I, ROBERT LEE PRATT, of Tigerville, in the parish of Terre Bonne and State of Louisiana, have invented a certain new and useful Improvement in Adjustable Cuff-Retainers, of which the following is a full, clear, and exact description.

The object of my improvement is to provide an adjustable cuff-retainer whereby the sleeve-wristband is adjusted coincidently with the cuff, so that it will never project beyond the same.

I will first describe in detail a cuff-retainer embodying my improvement, and then point out the various features of the improvement in the claims.

Reference is to be had to the accompanying drawings, forming a part of this specification, in which similar letters of reference designate corresponding parts in all the figures.

Figure 1:
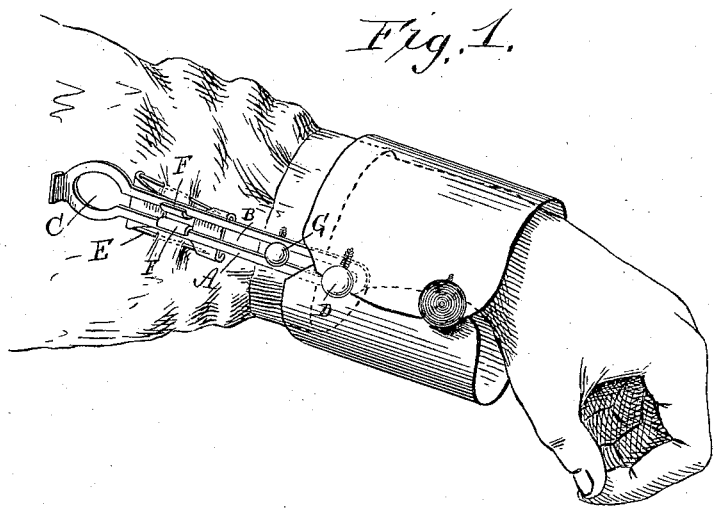
Figure 2:
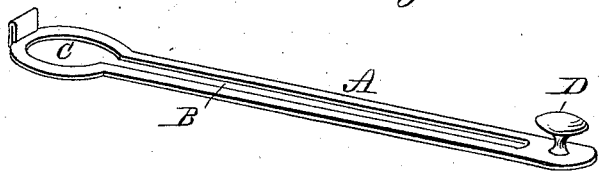
Figure 3:
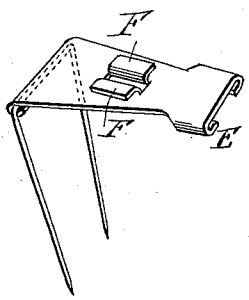

Figure 1 is a perspective view illustrating the application of a cuff retainer in which my improvement is embodied. Figs. 2 and 3 are detail views of parts of the said retainer.

The flexible shank A of the retainer, which has a longitudinal slot, B, preferably enlarged at one end to form an opening, C, is provided at one end part with a fastener, D, adapted for attachment to the cuff, the fastener D shown being a stud, which may be inserted through the extra button-hole of the cuff, as in Fig. 1. In lieu of this form of fastener, however, any suitable catch, clasp, or kindred device may be employed. The shank A also has a suitable fastener, E, for attachment to the shirt-sleeve.

The fastener E shown and preferred is of the usual double-pin form, which may be engaged with the shirt-sleeve above the wristband thereon, as shown in Fig 1.

The cuff-fastener D and sleeve-fastener E on the shank are arranged adjustable lengthwise relatively to each other, in the present case by mounting the fastener E to slide on the shank, the fastener D being fixed.

The fastener E is here shown with ears F struck upward from the body of the fastener and bent laterally and oppositely outward, which ears can be passed through the end enlargement or opening, C, of the slot B in the shank and slid stiffly lengthwise in the main portion of the slot.

The fastener E being engaged with the shirt-sleeve at the proper distance above the wristband, the cuff can be readily adjusted to any desired elevation by moving the shank carrying the cuff - holder on the fastener, as described. In order that the wristband may not fall below the cuff when it becomes necessary to attach the fastener E to the sleeve at a considerable distance above the wristband, I provide means for connecting the same to the adjustable fastener D. In the present case this end is attained by passing the usual wristband-stud, G, through the opening C in the shank before the fastener E is attached thereto and sliding it up in the slot B in advance of the fastener E. The stud G is confined in the slot by its head, and although allowed a limited play lengthwise in the slot it can never go beyond the cuff-holder D, so that the wristband is adjusted simultaneously with the cuff.

Having thus described my invention, what I claim as new, and desire to secure by Letters Patent, is—

1. In a cuff-retainer, the combination of a shank, A, a cuff-fastener, D, a sleeve-fastener, E, and a wristband-fastener, G, the said fasteners D and G being adjustable with respect to the said fastener E, substantially as described.

2. In a cuff-retainer, the combination of a shank, A, having a slot, B, with enlarged opening C, a cuff-fastener, D, and a sleeve-fastener, E, having ears F, adapted to pass through the opening C, but not through the slot B, substantially as described.

ROBERT LEE PRATT.

Witnesses:
T. H. CASEY,
J. B. MOODY.